J. REID.
OIL BURNING FURNACE FRONT.
APPLICATION FILED MAY 5, 1920.
1,370,486.
Patented Mar. 1, 1921.
8 SHEETS—SHEET 1.
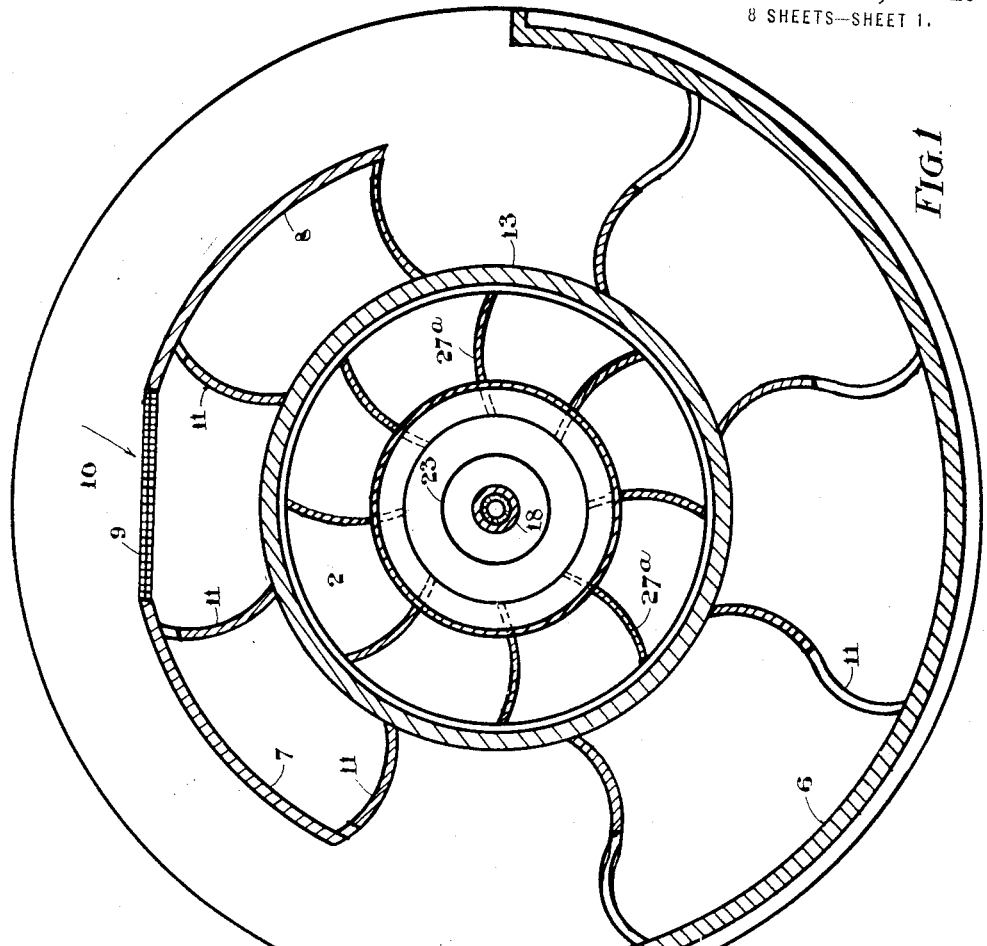
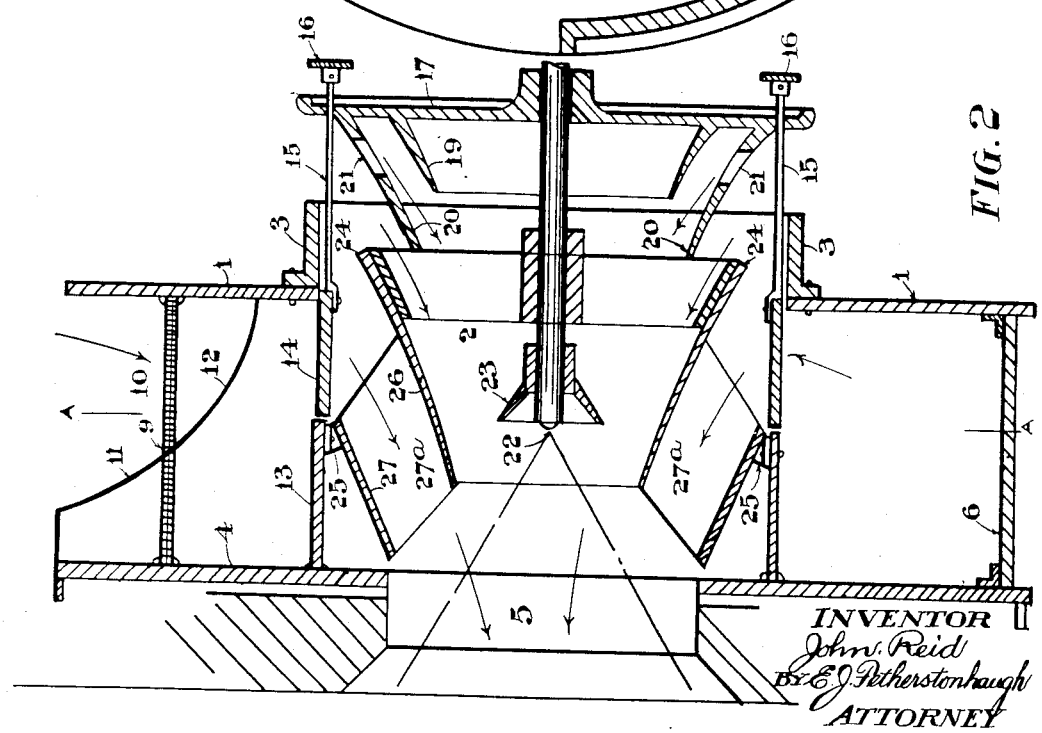
INVENTOR
John Reid
BY E.J. Fetherstonhaugh
ATTORNEY J. REID.
OIL BURNING FURNACE FRONT.
APPLICATION FILED MAY 5, 1920.
1,370,486.
Patented Mar. 1, 1921.
8 SHEETS—SHEET 2.
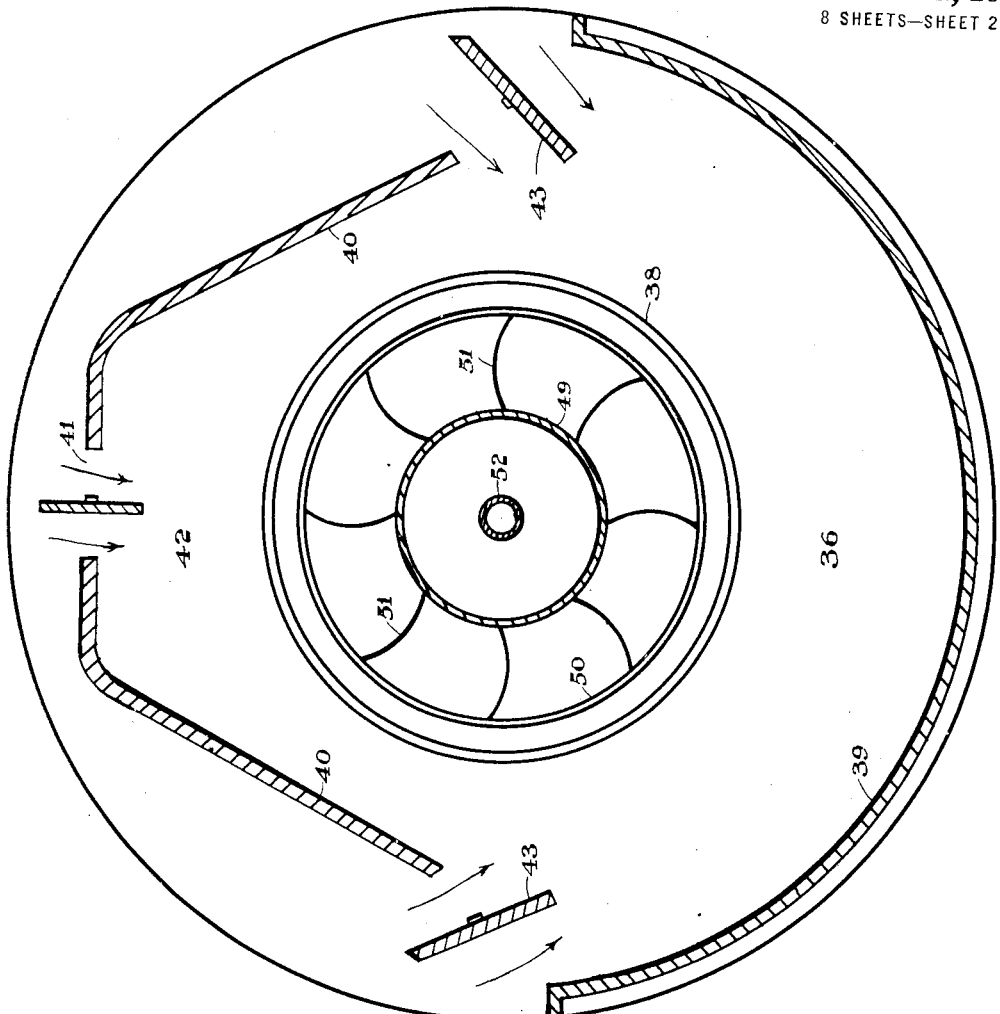
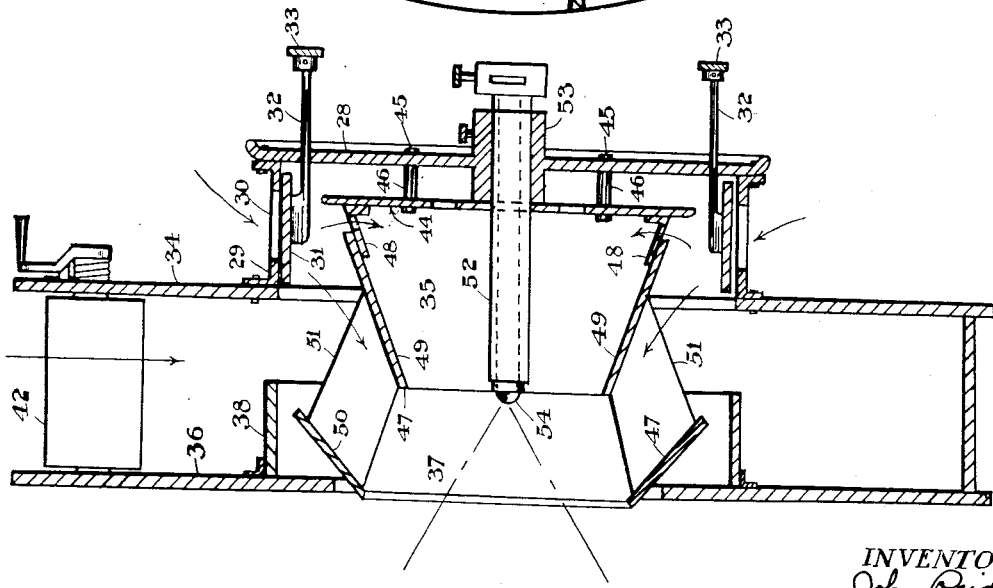
INVENTOR
John Reid
BY E. J. Featherstonhaugh
ATTORNEY

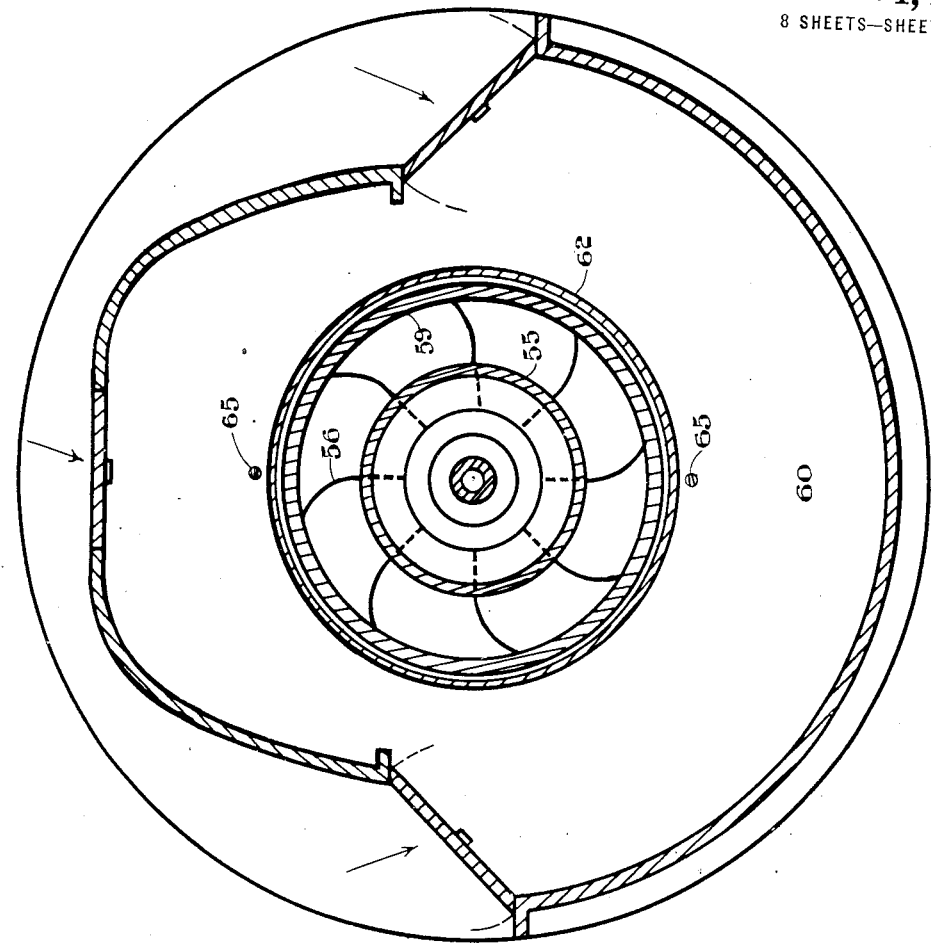
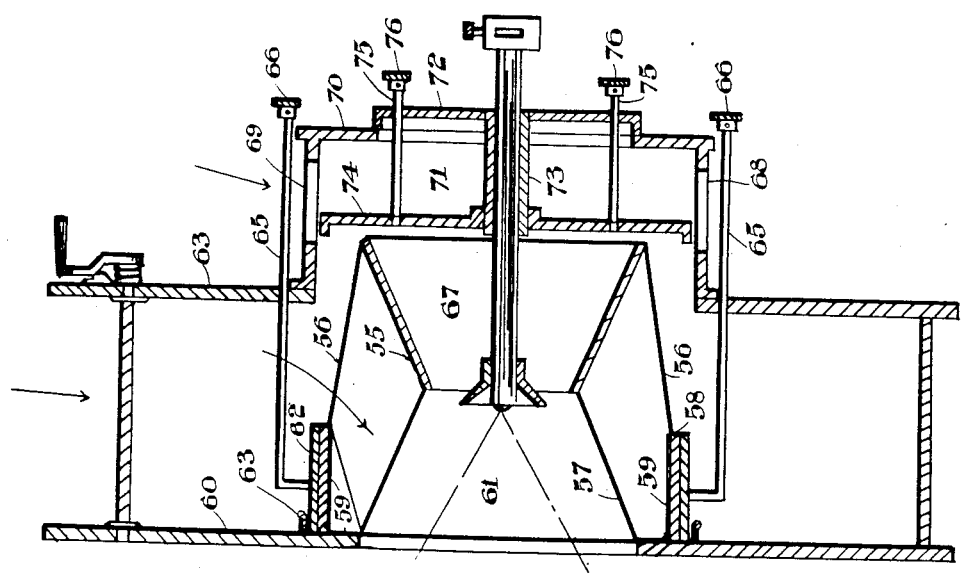

J. REID.
OIL BURNING FURNACE FRONT.
APPLICATION FILED MAY 5, 1920.

1,370,486.

Patented Mar. 1, 1921.
8 SHEETS—SHEET 4.

INVENTOR
John Reid
BY E. J. Fetherstonhaugh
ATTORNEY

J. REID.
OIL BURNING FURNACE FRONT.
APPLICATION FILED MAY 5, 1920.

1,370,486.

Patented Mar. 1, 1921.
8 SHEETS—SHEET 5.

INVENTOR
John Reid
BY
ATTORNEY

J. REID.
OIL BURNING FURNACE FRONT.
APPLICATION FILED MAY 5, 1920.

1,370,486.

Patented Mar. 1, 1921.
8 SHEETS—SHEET 6.

INVENTOR
John Reid
BY E.J. Fetherstonhaugh
ATTORNEY

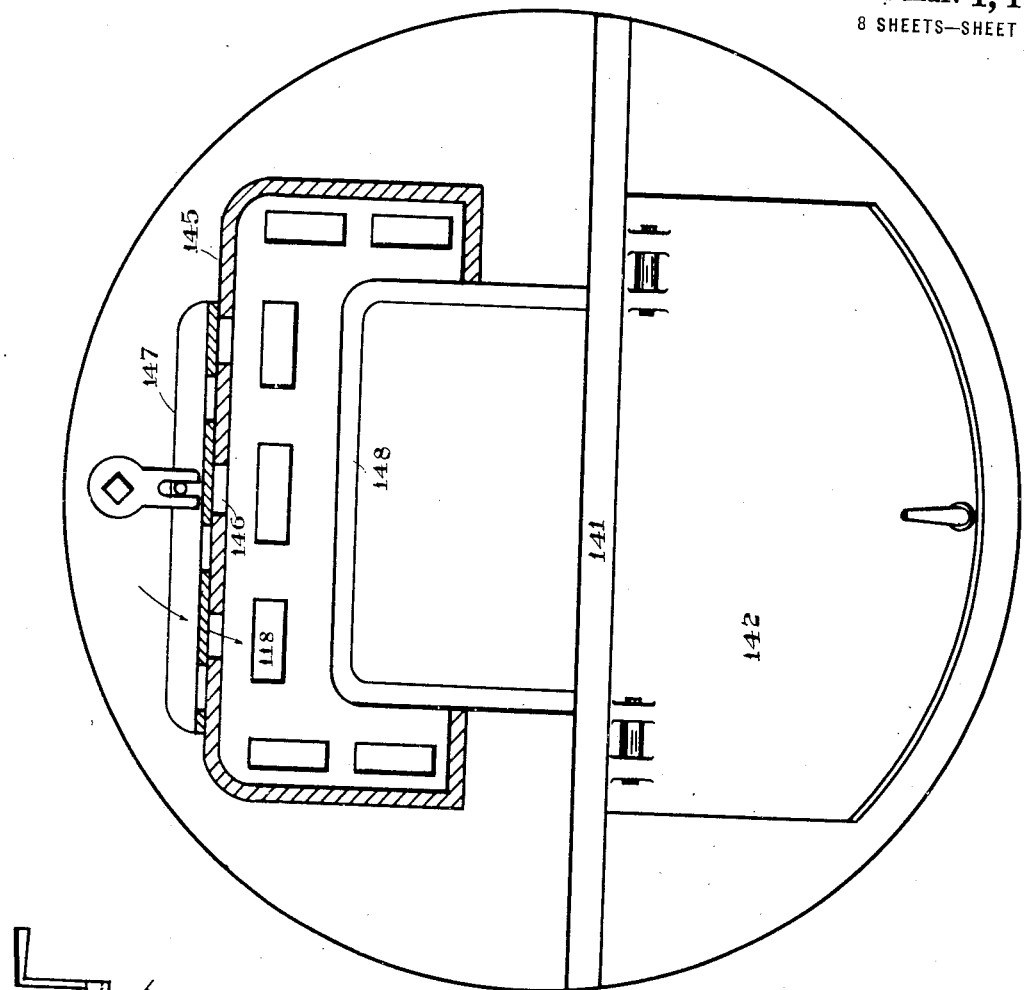
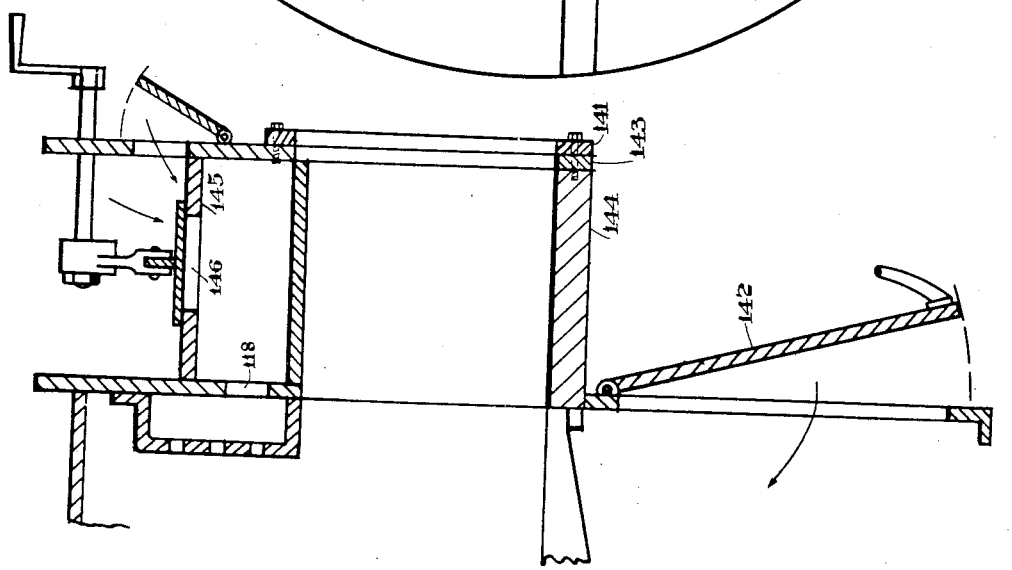

J. REID.
OIL BURNING FURNACE FRONT.
APPLICATION FILED MAY 5, 1920.

1,370,486.

Patented Mar. 1, 1921.
8 SHEETS—SHEET 8.

INVENTOR
John Reid
BY E. J. Fetherstonhaugh
ATTORNEY

UNITED STATES PATENT OFFICE.

JOHN REID, OF NEW YORK, N. Y.

OIL-BURNING-FURNACE FRONT.

1,370,486.  Specification of Letters Patent.  Patented Mar. 1, 1921.

Application filed May 5, 1920. Serial No. 379,195.

*To all whom it may concern:*

Be it known that I, JOHN REID, a subject of the King of Great Britain, and residing at 30 Church street, in the city of New York, in the State of New York, in the United States of America, have invented new and useful Oil-Burning-Furnace Fronts, of which the following is a specification.

The invention relates to oil burning furnace fronts, as described in the present specification and illustrated in the accompanying drawings, that form part of the same.

The invention consists essentially in the novel means employed for directing the air and the general assembly of the parts, whereby the air flows into the firebox in a stream, which is bent intermediately of the depth of the pocket and accelerated in speed immediately preceding its delivery to the flame, and whereby the removal of the parts for conversion purposes is much facilitated leaving the main parts as permanent features in a coal burning furnace front.

The objects of the invention are to direct the air into a furnace along the line of least resistance and thereby promote the combustion of the fuel and insure economy in the consumption of the same, as well as materially increasing the steaming properties of the furnace; to simplify the construction in furnace fronts, so that all parts may be handled with ease both for installation and maintenance by practically unskilled men; to furnish to the trade facilities in regard to structural association of the parts, that will enable steamship owners and others to supply themselves with spare parts, in order to effect quick repairs and also replace essential pieces to effect ready conversion of the front in the event of a steamship being transferred temporarily to foreign waters, where coal fuel is more in abundance than oil; to vary and carry on the work in the development of the furnace fronts described in the many applications and patents, some of which may be herein mentioned, such as Serial Number 299,361 filed May 23rd 1919, Serial Number 323,177 filed September 11th 1919, Serial Number 334,355 filed October 29th, 1919, Serial Number 315,904 filed August 7th 1919, Serial Number 345,396 filed December 16th 1919, Serial Number 291,362 filed April 19th, 1919, Serial Number 364,343 filed March 8th 1920, Serial Number 364,342 filed March 8th 1920, and the following patents: Number 1,321,555 dated November 11th 1919, Number 1,322,343 dated November 18th 1919 and Number 1,297,247 dated March 11th 1919; and generally to provide a substantial, efficient and serviceable furnace front.

In the drawings, Figure 1 is a front elevation of the back plate, showing intermediate parts in section and a very effective arrangement of air deflecting members for both natural and forced draft.

Fig. 2 is a vertical sectional view of the invention as illustrated in Fig. 1.

Fig. 3 is a front elevation of the back plate, showing an effective air deflecting arrangement associated with a standard form of pocket in the Reid furnace fronts.

Fig. 4 is a vertical sectional view of the invention as illustrated in Fig. 3.

Fig. 5 is a front elevation of the back plate, showing still a standard air pocket and a variation in the deflecting arrangement and the front closure.

Fig. 6 is a vertical sectional view of the invention as illustrated in Fig. 5.

Fig. 13 is a front elevation of the back plate, showing intermediate parts in section of the front illustrated in Figs. 11 and 12 converted to coal burning purposes.

Fig. 14 is a vertical sectional view of the front illustrated in Fig. 13.

Like numerals of reference refer to the same parts in the figures in the drawings belonging to each form of the invention respectively.

Figures 7, 8:
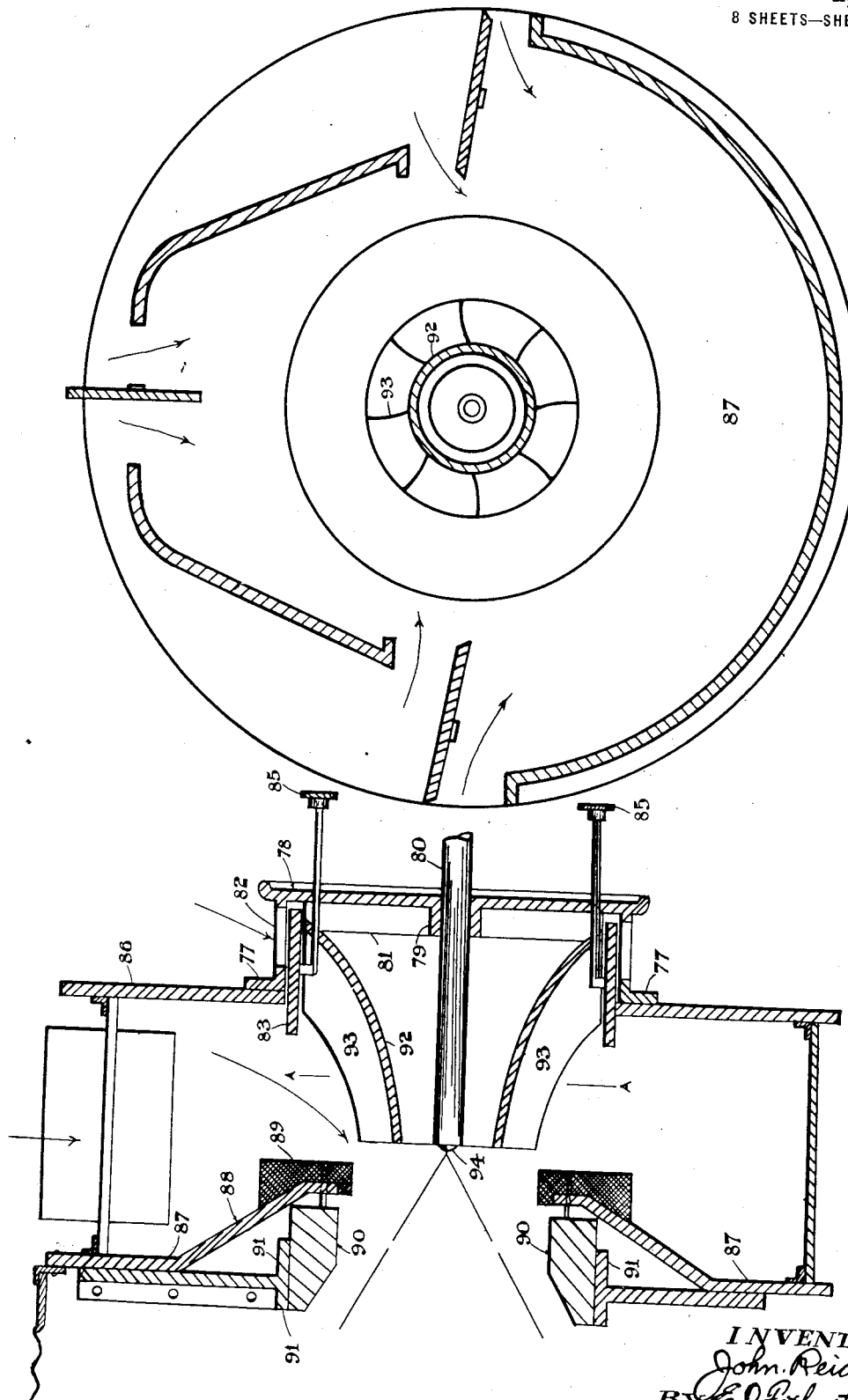
Fig. 7 is a front elevation of the back plate, showing the standard type of air pocket and a change in the back plate for more efficient air deflection as well as a new form of cone deflector.
Fig. 8 is a vertical sectional view of the invention as illustrated in Fig. 7.

In this invention, the drawings throughout are intended to illustrate the facility with which the air may be taken into the air pocket formed by the plates of the front, either by natural draft or forced draft, and from this pocket successfully delivered to the flame, so that where the air flows in naturally the stream is directed in a long natural curve resembling to some extent a central dip or depression in the stream or streams as the case may be, while in the forced draft the bend in the stream may readily be much sharper and more pronounced, but in the actual delivery the same direction is maintained as with the natural draft.

Referring to the drawings, and particularly to Figs. 1 and 2, the front plate 1 is here shown as formed with a central opening 2 and around this opening the flanged ring 3 is rigidly secured to the said front plate and projects outwardly therefrom forming an extension of the air pocket between the said front plate 1 and the back plate 4.

The back plate 4 is formed with the flame opening 5.

The intermediate wall 6 or flare extends from the front plate to the back plate and around the lower portion thereof, the upper portion of the pocket being closed in by the intermediate walls 7 and 8 and the air screen 9 across the air inlet 10.

The screen 9 is flanked on either side by the deflecting plates 11, which extend from the back plate 4 to the front plate 1, but which are cut away at 12 for the circulation of air throughout the pocket.

The deflecting plates 11 are preferably formed in a double curve and, at their inner ends reach to the annular wall 13 extending from the back plate 4 for approximately one half of the depth of the air pocket.

The sleeve valve 14 is so formed as to extend from the end of the annular wall 13 to the front plate 1 and is carried at the end of the rods 15, the latter being operated by the handle 16.

The closure plate 17 is mounted on the oil pipe sleeve 18 and is adjustable thereon, so as to leave an opening between itself and the flanged ring 3, in order to obtain natural draft effects.

The rods 15 are suitably mounted in said closure plate and slide therein.

The deflecting cones 19 and 20 are rigidly secured to, or form part with the closure plate 17, the smaller cone 19 being within the outer and larger cone 20, the latter having the air ports 21 through which the air may flow to be directed by the inner cone 19.

The sleeve valve 14 is moved rearwardly and forwardly to regulate the size of the annular air ports for the air flowing toward the flame from the burner 22.

The burner mouth deflecting member 23 is mounted on the oil pipe sleeve 18.

The double cone deflector 24 is secured by the brackets 25 to the annular wall 13 and is formed with an inner cone shell 26 and an outer cone shell 27, the brackets 25 being secured to the latter, which extends from the extremity of said annular wall to the flame opening 5 and is supported from the inner shell by the vanes 27$^a$, which reach back on the inner cone shell to present an oblique edge across the air paths both natural and forced, therefore there is an air passage between the inner shell 26 and the outer shell 27 to the flame from the burner 22 partitioned by said vanes, which are preferably curved.

There is also an air passage between the cone 20 and the inner wall of the cone shell 26 and a passage between the cone 20 and the cone 19, but these last passages are more particularly for natural draft effects, as when the closure plate 17 is pulled outwardly, the air flows in through the several passages and is deflected on to the flame, thus it will be seen that a most excellent arrangement is provided for feeding the flame without necessarily using the forced draft.

In the forced draft, the air enters the inlet, which may be placed at any suitable position or which may be of any size desired, and following the entrance of this air, which is being blown in the customary manner, the great volume is distributed around the front between the plates thereof, and is deflected by the plates 11 and guided to the double cone deflector 24. To reach this double cone deflector the sleeve valve 14 must be pulled outwardly to leave a port of the desired size. The air flowing in from the forced draft strikes the outer wall of the inner cone shell 26 and then strikes the inner wall of the outer cone shell 27 with the result that it is directed on to the flame at the most desirable distance from the burner 22.

In Figs. 3 and 4 a closure plate 28 is permanently secured to a flange ring 29.

The flange ring 29 is formed with the air ports 30, which are closed by a sleeve valve 31 operated by the rods 32 terminating in the handles 33.

The front plate 34 is formed with the opening 35 around which the flanged ring 29 is secured.

The back plate 36 is formed with the flame opening 37 and the annular wall 38 extends toward the front plate for about half the distance between the front and back plates around said flame opening 37.

The intermediate walls between the front and back plates in this construction are shown as the flare 39 closing in the lower part of the air pocket and the shield wall 40 forming the upper cover and having a central port 41 closed by the valve 42.

The side valves 43 close the ports between the lower ends of the shield wall 40 and flare 39.

The perforated plate 44 is secured to the closure plate 28 by the bolts 45 and distanced from said closure by the distancing pieces 46 and this plate 44 supports the double shell cone deflector 47, which is secured to said plate 44 by the angle brackets 48. The inner shell 49 of said cone deflector 47 terminates about midway of the distance between the front and back plates, and the outer shell 50 is held from said inner shell 49 by the vanes 51, which extend across the air port between the extremity of the annular wall 38 and the front plate in an oblique line.

The outer shell 50 extends into the flame opening 37 and is set at a different angle from the inner cone shell 49.

The oil pipe sleeve 52 is supported in the boss 53 of the closure plate 28 and the burner 54 is at the inner end of said oil pipe sleeve 52, which is at or about the extremity of the inner cone shell 49.

It will be seen in this construction that the general course of the air is much the same as in Figs. 1 and 2, but there are important modifications, which are in the main constructional features, as for instance in this form of the invention the well known air pocket in the Reid type of furnace fronts is used with the shield wall, the flare and the valves, but this form of air pocket has nothing to do with this particular type of double cone deflector, because the double cone deflector shown in Fig. 4 would also be applicable in the form of the invention illustrated in Figs. 1 and 2.

The course of the air in natural draft is through the ports in the flanged ring, then between the vanes connecting the outer and inner shells of the double cone deflector, where it is deflected directly on to the flame by the inner wall of the outer cone shell.

In the forced draft the air enters as usual through the top and side ports and flows directly on the side of the aforesaid vanes and is deflected between the outer and inner shells of the double cone deflector directly on to the flame at the most desirable point.

In Figs. 5 and 6 a construction very similar to Figs. 3 and 4 is shown, the difference being principally in the form of a cone deflector.

This cone deflector is formed with the shell 55 from which project completely therearound the vanes 56, these vanes being preferably of curved formation and extending inwardly at their tips 57 toward the flame opening, and at their outer corners 58 being secured to the annular wall 59 extending from the back plate 60 around the flame opening 61.

The sleeve valve 62 slides into the pocket 63 on the outer side of the annular wall 59 and is operated in the direction of the front plate 63 by the rods 65 terminating in the handles 66, which pass through the front plate.

The opening 67 in the front plate is surrounded by the flanged ring 68 having an air port 69, and this flanged ring 68 is integral with the cover 70, the latter having an opening 71 closed by the lid 72.

The oil pipe sleeve 73 extends inwardly from the lid 72 and the sliding plate valve 74 is adjustably mounted on the said sleeve 73 and is operated by the rods 75 extending in through the lid 72 and terminating in the handles 76.

The sliding plate valve 74 moves up to and closes the inner end of the cone shell 55 and also cuts off the air ports 69, but by drawing the said plate valves 74 toward the cover 70, the ports 69 are opened for natural draft and also the entrance of the interior of the cone shell 55.

In forced draft, the air flows through the port between the front plate and the annular wall 59 and is deflected by the cone shell and passes through the passages made by the vanes 56.

In Figs. 7 and 8 another construction is shown, though following generally on the same lines.

The flanged ring 77 and cover 78 are shown as one piece and the boss 79 in the center of the cover 78 carries the oil pipe sleeve 80 and spider 81.

The flanged ring 77 is formed with the air ports 82 and these ports are closed by the sleeve valve 83, which is operated by the rods 84 extending through the cover 78 and terminating in the handles 85.

The sleeve valve 83 moves through the opening in the front plate 86 across to the recessed back plate 87, which at the end of the inwardly recessed wall 88 carries the gridded ring 89 filled with refractory material.

The ring 89 is shown on the inner side and end of the recessed wall section 88 and surrounds the flame opening and the sleeve valve 83 moves toward said ring.

The brick 90 around the outer side of the flame opening is held by the plates 91, which are secured to the furnace structure.

The cone deflector 92 is secured to the spider 81 and is here shown with the outer vanes 93 extending across and into proximity with the refractory ring 89.

The cone shell 92 extends from the spider, but there is space between the cone shell and the cover 78 for the flow of air into the interior of the shell in natural draft effects.

In this construction the air enters the pocket between the plates about which nothing further has been described in this particular form of the invention and flows through the port between the refractory ring 89 and the end of the sleeve valve 83 passing into the passages between the vanes 93 and deflected by the curved tapering shape of the cone shell 92 to the flame beyond the burner mouth 94.

Figure 9:
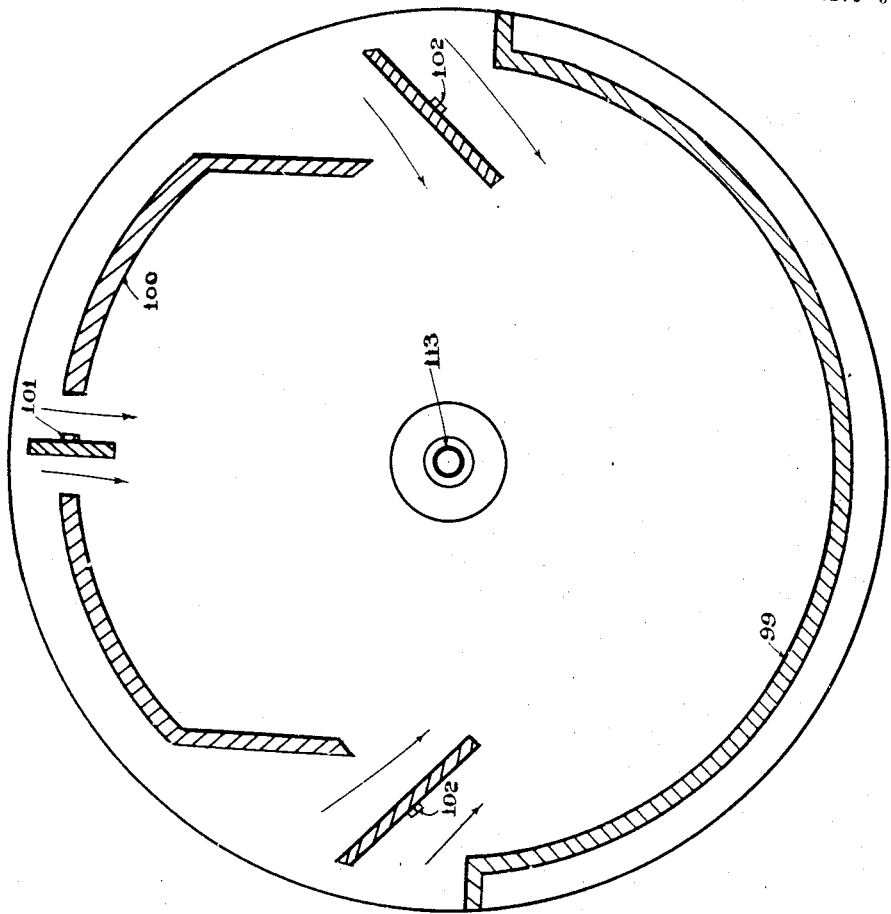
Fig. 9 is a front elevation of the back plate, showing a standard pocket and modifications of the deflecting members and closure for the front opening.
Figure 10:
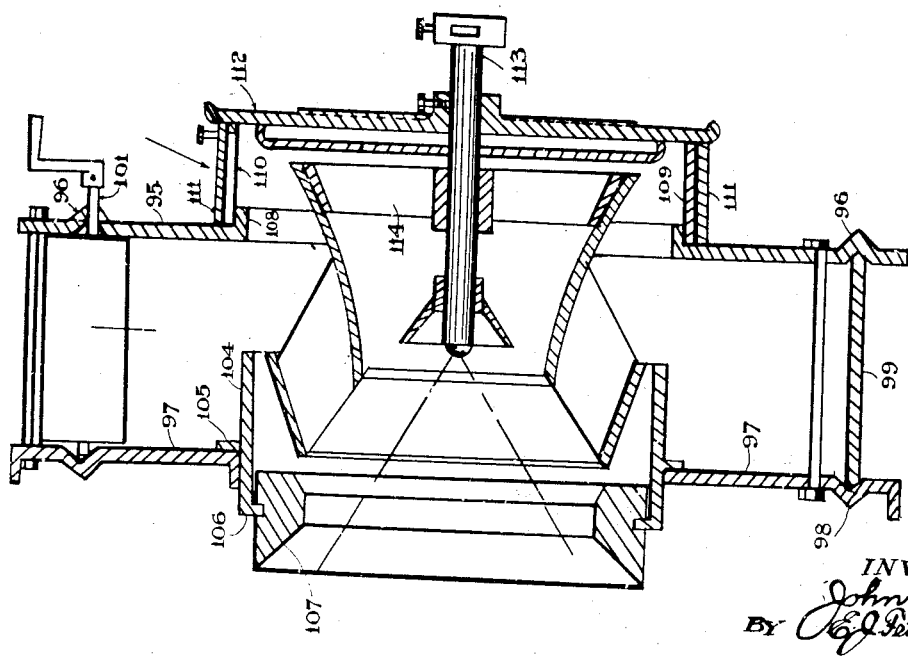
Fig. 10 is a vertical sectional view of the invention as illustrated in Fig. 9.

In Figs. 9 and 10 the only material differences are the change in construction for a stamped front.

In this the front plate 95 is shown with corrugations 96 and the back plate 97 with corrugations 98, in which the intermediate flare or wall 99 is secured and also the upper shield wall 100 and valve spindle 101 has also the side valve spindles 102.

In this construction there may be many more corrugations to strengthen it according to the weight of the material used.

The back plate 97 is herein shown as formed with the flame opening 103 and in this flame opening a cylinder 104 is inserted and secured by means of a flange 105.

The cylinder 104 is inwardly turned, where it projects in the direction of the firebox beyond the back plate 97 and this inwardly turned end 106 supports the brick 107 or other refractory ring.

The front plate 95 is outwardly flanged at its opening 108 and the ring 109 is secured around the flanged opening 108 and is formed with ports 110, which register with ports in the rotating valve 111 mounted on said ring 109 and operated by a suitable handle.

The closure plate 112 closes in the ring 109 and is movable away therefrom on the oil pipe sleeve 113.

The oil pipe sleeve 113 also carries the spider 114 and this spider supports the double shell cone deflector 115, which is of similar construction to those described hereinbefore.

In this form of the invention the forced draft or entrance into the air pocket is from the upper side of the front and the air flows around and in between the vanes of the cone deflector 115 and is directed by the double cone shells to the flame.

For natural draft effects the valve 110 is rotated, which opens the ports through the ring 109 and allows the air to flow in to the flame. This natural draft can be increased by opening the closure plate 112.

Figure 11:
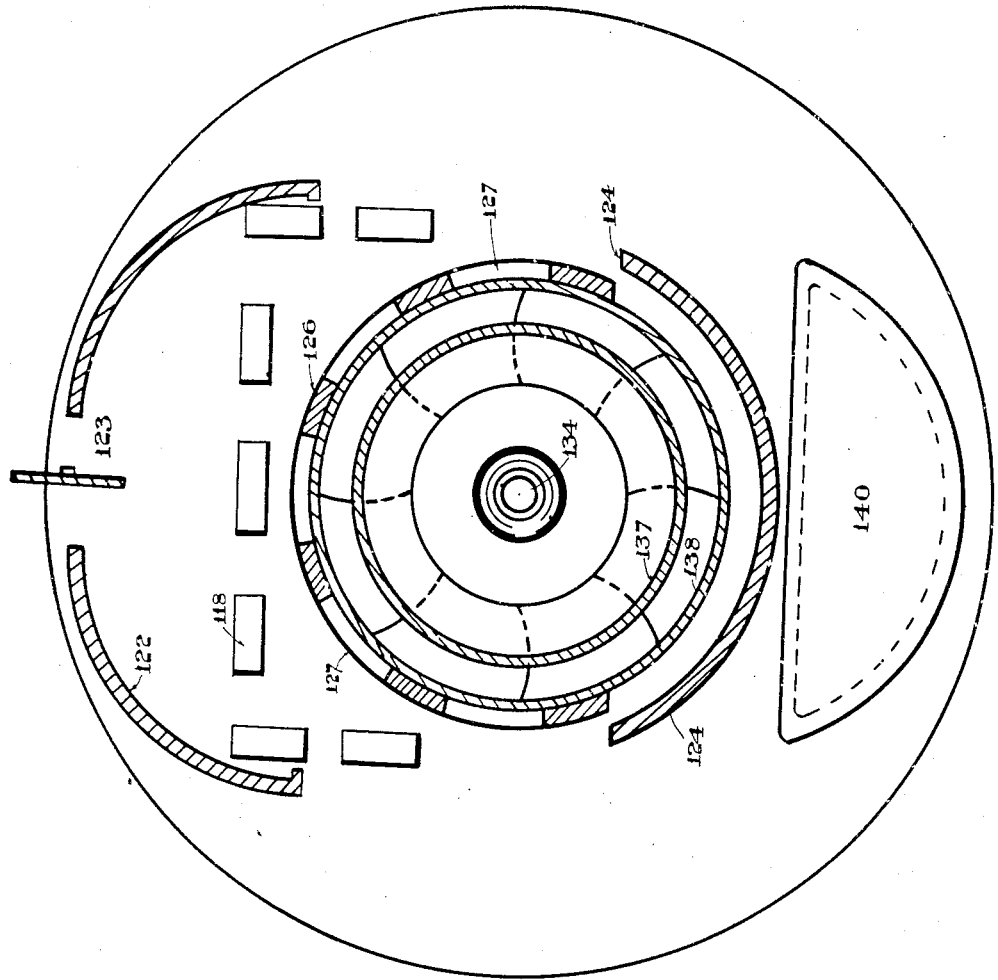
Fig. 11 is a front elevation of the back plate, showing an easily converted type in this invention from oil to coal burning furnaces.
Figure 12:
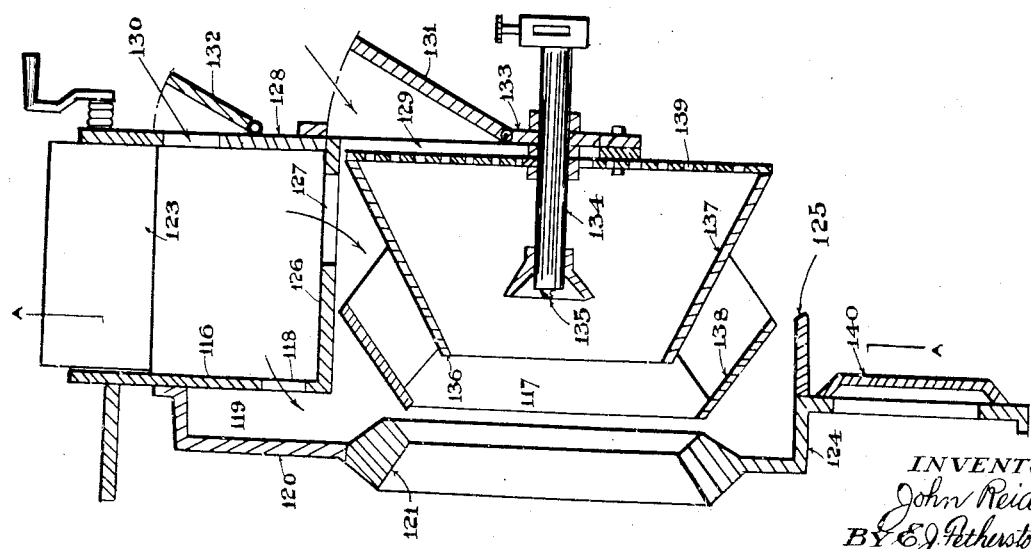
Fig. 12 is a vertical sectional view of the invention as illustrated in Fig. 11.
Figure 15:
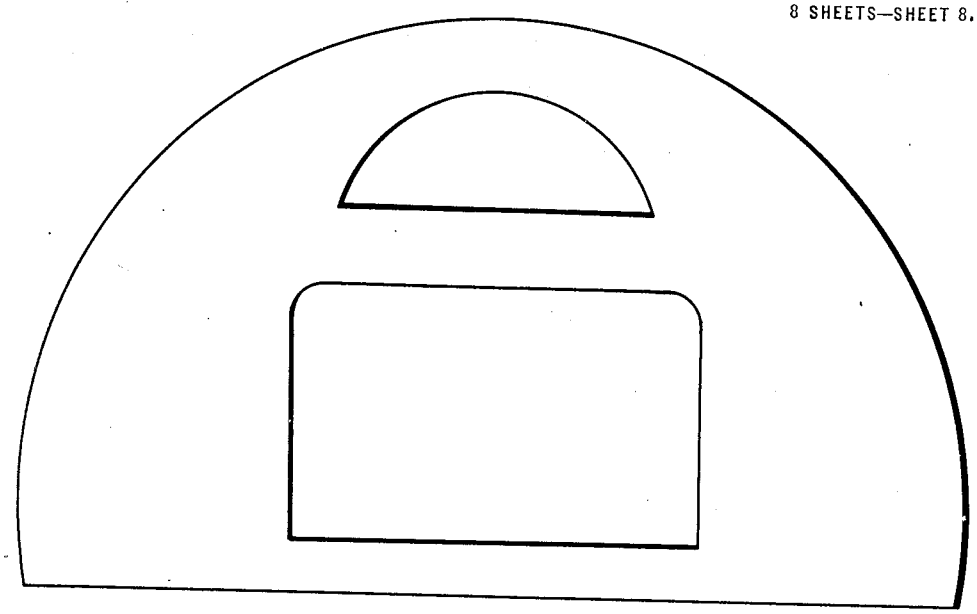
Fig. 15 is a plan view of the front plate of the furnace front illustrated in Figs. 11–14.
Figure 16:
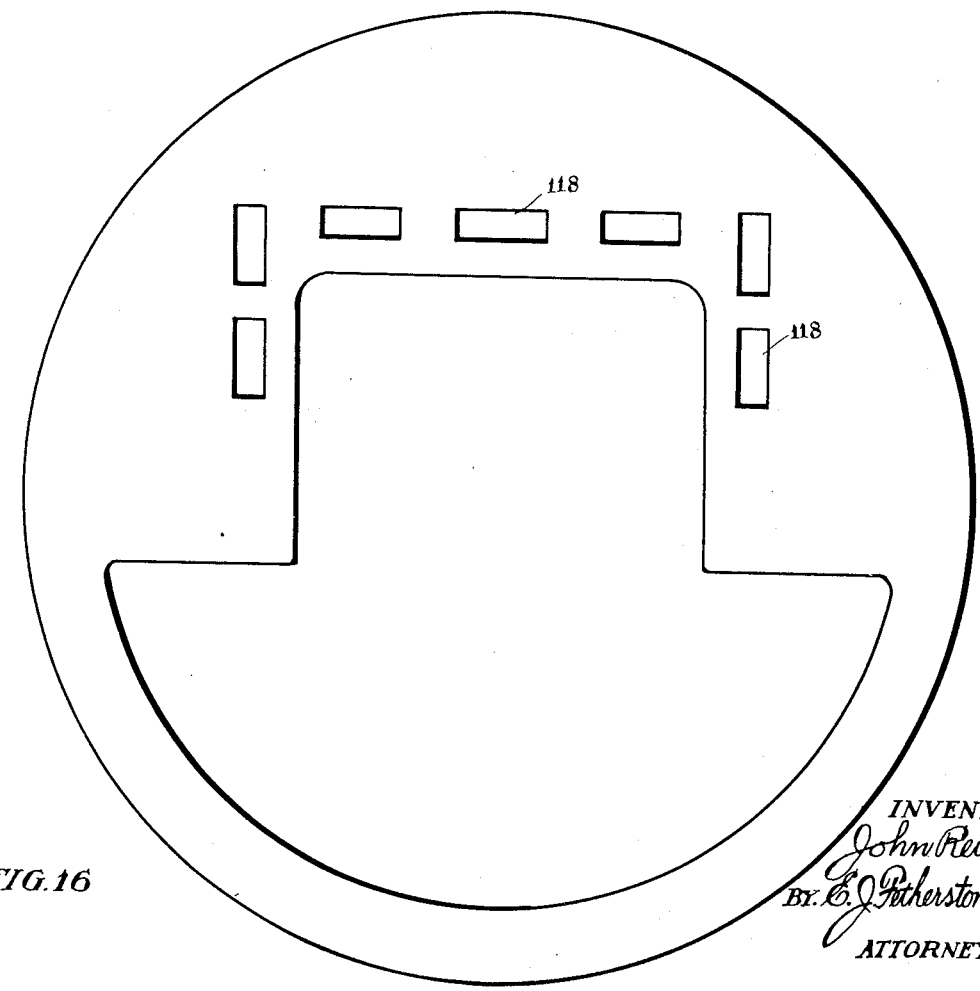
Fig. 16 is a plan view of the back plate of the furnace front illustrated in Figs. 11–14.

In Figs. 11, 12, 13, 14, 15 and 16 a particularly desirable form of this invention is shown for the ready conversion of the front to coal burning without removing the main parts and in the Figs. 11 and 12 the front for oil burning purposes only is illustrated.

The back plate 116 is formed with the flame opening 117 and the air openings 118 to the lining air pockets 119, which are inclosed by the lining plates 120 carrying in the center thereof, the Venturi ring 121, the upper shield wall 122 is shown as formed with a central air port and air valve 123.

The lower shield wall 124 extends outwardly from the back plate 116 and the outer section thereof 125, is upturned slightly.

The inner shield wall 126 extends partially around the flame opening 117 in the back plate and is formed with the ports 127. This wall leaves an opening at the lower end beyond, which the lower shield wall 124 extends at each end.

The upper shield wall 122 and the inner shield wall 126 extend to the front plate 128, but not the lower shield wall 124, which is removable as well as the other shield walls.

The front plate extends downwardly a little more than half the size of the back plate and is formed toward the lower end with the opening 129 and above that opening the opening 130, both these openings being closed by natural draft doors 131 and 132 respectively.

The door 131 swings outwardly from the closure plate 133, part of which permanently closes a portion of the opening 129 and in this permanent closure the oil pipe sleeve 134 is mounted and extends inwardly terminating in the burner 135.

The double cone deflector 136 is also supported from the oil pipe sleeve or in any other suitable way and is formed with an inner and outer shell 137 and 138 respectively, and the perforated back 139 which is completely exposed below the front plate to the air and above is open to the natural draft when the door 131 is let down.

It will be seen that in this construction the natural draft is permanently open while the upper draft may be closed at will and if forced draft is desirable it will be operable under certain conditions, but this front by removing the plate 140 from the lower part of the back plate opening and installing the dead plate 141 across said opening, it is possible then to hang on to the said dead plate the ash pit door 142, of course previous to this the double cone deflector, the Venturi ring and the lower shield wall have all been removed together with the closure plate 133 and natural draft door 131. This leaves the frame 143 at the bottom of the opening 129 in the front plate, to which the sill 144 extending from the dead plate 141 is rigidly secured. This forms a bottom for the fuel passage in solid fuel.

The upper shield wall 122 with valve is also removed as well as the inner shield wall 126 which is almost directly a part of the oil burning equipment.

The air cover plate 145 is then substituted for the upper shield wall and embraces the air opening 118 to the lining having upper ports 146 closed by the slide valve 147 or other style of valve.

The fire box casting 148 or fuel passage casing is mounted on the sill 144 between the inturned ends of the air cover plate 145 similar to the many forms shown in the earlier patents and applications.

This completes the conversion of the front for solid fuel burning and while it is primarily an oil burning front, it is a great convenience to be able to convert it for solid fuel without taking the whole structure down.

In the several forms of this invention illustrated many interchanges may be made from one form to the other and parts illustrated in some figures may be used in the other forms of the invention and generally speaking it will be understood that without departing from the spirit of the invention changes in the construction may be made and so long as these changes are within the scope of the claims for novelty following the protection accorded shall not be invalidated.

What I claim is:—

1. In a furnace front having a front plate with an opening and a back plate with a flame opening, said plates forming an air pocket having a main inlet, a closure to said front opening formed of a flanged ring and a closure plate having deflecting members from said closure plate, an annular wall projecting from the back plate around said flame opening and terminating intermediate of the distance to the front plate forming an air port for the remaining distance, a cone deflecting member having vanes projecting from the main shell thereof and extending across said air port and across the path of a natural draft flow, a sleeve valve operated from the front plate, an oil pipe sleeve and a burner.

2. In a furnace front having a front plate with an opening and a back plate with a flame opening, said plates forming an air pocket having a main inlet, a closure capping said front opening and formed of a flanged ring and a closure plate, an annular wall surrounding the flame opening and extending part way to the front plate, a sleeve valve operating from said flanged ring to the extremity of said annular wall, a double shell cone deflector having vanes extending from shell to shell and projecting forwardly toward the flame opening in a direction to cross the port closed by said sleeve valve and also in the line of the natural draft, an oil pipe sleeve and a burner.

3. In a furnace front having a front plate with an opening and a back plate with a flame opening, said plates forming an air pocket having a main inlet, a closure capping said front opening and formed of a flanged ring and a closure plate, a wall extending part way to the front plate from the back plate around said flame opening, a double cone deflector having inside and outside shells separated by vanes projecting toward the flame opening and crossing the paths of air in an oblique manner, a sleeve valve operating in the direction of said deflecting wall, brackets securing the outside shell to the deflecting wall and an oil pipe sleeve and a burner.

4. In a furnace front having a front plate with an opening and a back plate with a flame opening, said plates forming an air pocket having a main inlet, a closure capping said front opening and having an adjustable lid moving to and from a flanged ring, an inner cone deflector and an outer cone deflector extending from said ring, an outer cone deflector having air ports therethrough, an oil pipe sleeve mounted in said lid, a double cone deflector encircling said burner and having inner and outer shells and vanes between said shells obliquely crossing the paths of the air in both forced and natural drafts, said lid cones and said double cone shells forming a plurality of natural air passages to the flame, a deflecting wall from the back plate and a sleeve valve for regulating the air delivered to said double cone deflector.

5. In a furnace front having a front plate with an opening and a back plate with a flame opening, said plates forming an air pocket having a main inlet, a closure capping said front opening formed of a flanged ring and a lid, an annular wall from the back plate around the flame opening, a double cone deflector having its outer shell extending from the extremity of the annular wall to the edge of the flame opening and its inner shell retired into the flanged ring aforesaid and its vanes reaching back from the outer shell in an oblique line crossing the paths of the air in both natural and forced draft, a sleeve valve meeting the said annular wall from the front plate and having rods and handles thereon for operating it, an oil pipe sleeve and a burner extending centrally into said inner cone shell.

6. In a furnace front having a front plate with an opening and a back plate with a flame opening, said plates forming an air pocket having a main inlet, a closure capping the front opening formed of a flanged ring and a lid, an oil pipe sleeve supported from said lid, a burner at the end of said sleeve, a cone deflector encircling said burner and suitably supported and having vanes projecting therefrom in the direction of the flame opening, a sleeve valve suitably operated and extending part way across the air pocket from the front plate, an annular wall extending from the back plate toward said sleeve valve, a plurality of deflecting plates extending from the back plate between the annular wall and the ends thereof and cut away toward the front plate and suitably curved, and a screen across the inlet to the air pocket and to all said deflecting plates and members.

7. In a furnace front having a front plate with an opening and a back plate with a flame opening, said plates forming an air pocket having a main inlet, a closure capping said opening formed of a flanged ring and a closure plate, said flanged ring having air ports therefrom, a sleeve valve closing said air ports and movable therefrom in the direction of the back plate, an annular wall projecting from the back plate to meet said sleeve valve, a cone deflector suitably supported, an oil pipe sleeve extending into said cone deflector, a burner terminating said sleeve, and rods secured to said sleeve valve and extending from said lid and having handles at the ends thereof.

8. In a furnace front having a front plate with an opening and a back plate with a flame opening, said plates forming an air pocket having a main inlet, a closure capping said front opening having a closure plate and a flanged ring with air ports, a sleeve surrounding said ring and movable to and from said ports, an oil pipe sleeve supported in said closure plate, a burner at the end of said oil pipe sleeve, a cone deflector having vanes projecting toward the flame opening and presenting oblique edges in the paths of the air both natural and forced, an annular wall projecting out from the back plate and means for regulating the flow of air by forced draft.

9. In a furnace front having a front plate with an opening and a back plate with a flame opening, said plates forming an air pocket having a main inlet, a closure capping said front opening and formed of a flanged ring and closure plate, said flanged ring having air ports therethrough and said closure plate having an opening therethrough, a lid for said closure plate opening, a sleeve extending inwardly from said lid, an oil pipe extending through said sleeve, a burner at the end of said oil pipe sleeve, a valve adjustable on said sleeve and operating within said flanged ring, an annular wall projecting from the back plate around the flame opening, a sleeve valve mounted on said annular wall and operated by rods projecting through the front plate, and a cone deflector encircling said burner and having vanes projecting therefrom rigidly secured to said annular wall.

10. In a furnace front having a front plate with an opening and a back plate with a flame opening, said plates forming an air pocket having a main inlet, a closure capping said front opening formed of a flanged ring and a closure plate, said flanged ring having ports therethrough, a cone deflector, a spider secured within said closure and supporting said cone deflector at a short distance from the closure plate, a sleeve valve closing said ports and operable toward the back plate, said back plate having a central portion of its wall around said flame opening inwardly recessed, a refractory ring secured at the end of said recessed wall, an oil pipe sleeve mounted in said spider, a burner at the end of said sleeve and brick and plate linings around and about said flame opening and back plate.

Signed at the city of New York, in the State of New York, in the United States of America, this 20th day of April, 1920.

JOHN REID.